Aug. 24, 1943.                O. P. WARNER ET AL                2,327,683
                              WIRE HOLDING DEVICE
                              Filed June 4, 1942
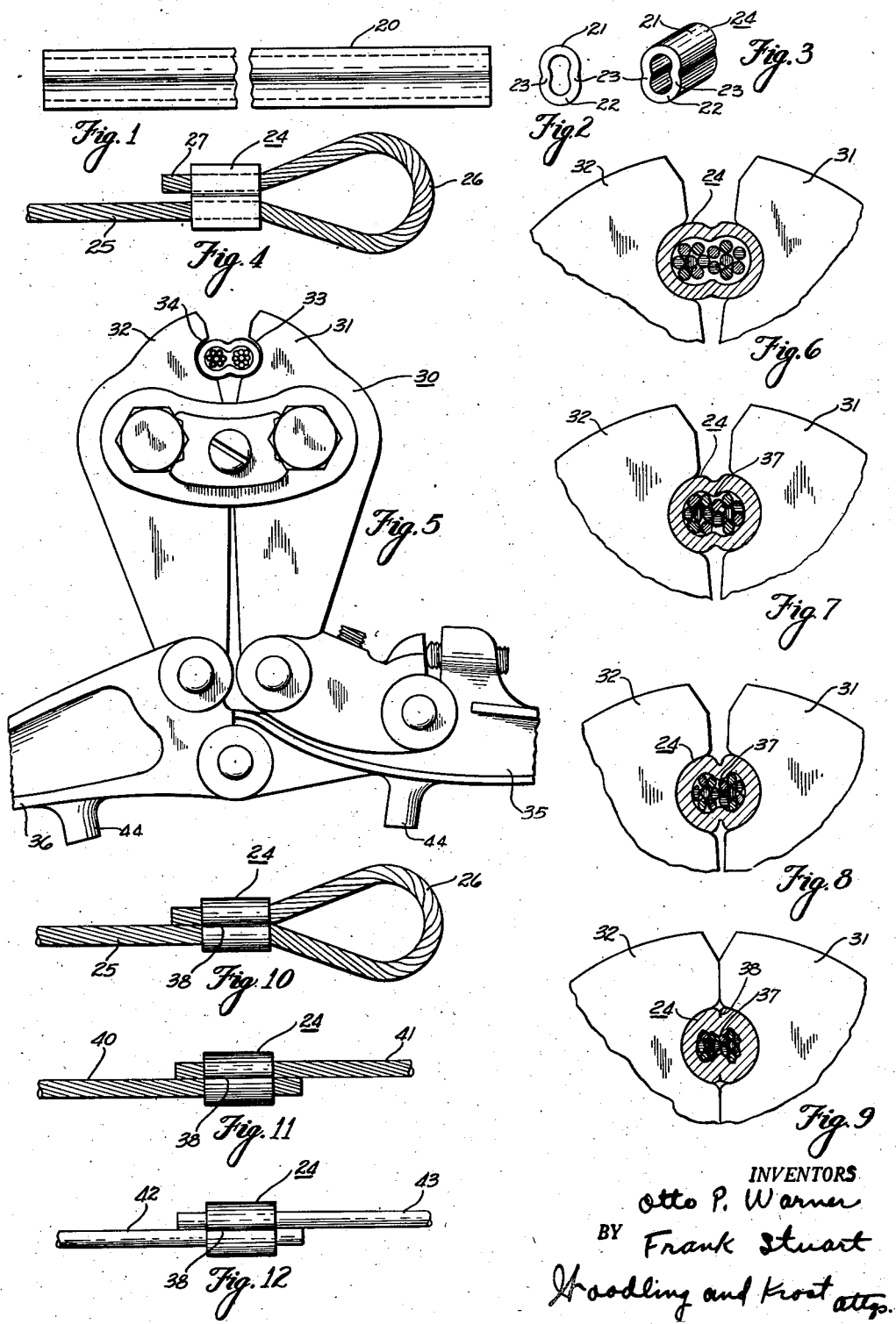
INVENTORS
Otto P. Warner
Frank Stuart
BY
Hoodling and Krost attys.

Patented Aug. 24, 1943

2,327,683

UNITED STATES PATENT OFFICE 2,327,683

WIRE HOLDING DEVICE

Otto P. Warner and Frank Stuart, Cleveland, Ohio, assignors to The National Telephone Supply Company, a corporation of Ohio Application June 4, 1942, Serial No. 445,739

4 Claims. (Cl. 287—78)

The invention relates in general to wire holding devices and more particularly to wire holding devices adapted to encompass and be compressed upon adjacently disposed wires for holding same together.

The term "wire" used herein is considered to cover stranded wires, solid wires, cable wires, rope wires, etc.

The invention of holding and joining wires together has many applications, particularly where the joined wires are adjacently disposed and are subjected to forces tending to make the adjacently disposed wires to move in opposite directions. Although not limited thereto, my invention finds special utility for making joints where the wires longitudinally overlap and lie side by side including splices and dead-ends where the end portion of the wire is looped through an eye or snubbed around a pole or other object and bent back upon itself and then joined together. Based upon actual practice and tests, the device has many advantages over past known methods and means of holding or joining wires together. For example, one widely used method of joining wires for the purposes outlined above is the tuck splice and the wrapping of a tightly drawn piece of wire around the tuck splice. This method is generally known as "tucking and serving" and requires a high degree of skill and much time to make a good connection. This method has its limitations, in that it is impossible to make such a joint or connection with high strength steel strands where the individual wires are large and stiff and accordingly the use thereof is confined to wire rope where the individual strands are comparatively small and flexible.

Another method used in the past entailed the use of dead-ending sockets, which are hollow. In this arrangement, the wire rope is placed in the hollow of the dead-ending socket, after which molten zinc is poured around the wire to make a solid grip. This scheme also required much skill, time and apparatus. Neither one of the two methods described above is easily made in the field. They are referred to as "shop splices and dead-ends."

A third arrangement, which has found wide usage because it does not require much skill and because it can be applied in the field is the employment of a wire rope clip comprising the combination of a U-bolt and a saddle. In this assembly, the adjacently disposed wires are inserted in the clip and the U-bolt and saddle are drawn tightly together by means of nuts threadably engaging the ends of the U-bolt. This arrangement is objectionable for the reason that the U-bolt which makes but a "line" contact on the wire severely "necks" or reduces the cross-sectional area of the wire and accordingly reduces the strength thereof. In addition, special observation must be made in applying the clip in order to so attach it that the U-bolt contacts the free end of the wire and not the loaded end, otherwise the life as well as the strength of the dead-end is materially reduced. Another objection to the clip is that care must be taken to draw up the nuts evenly. The nuts must also be drawn tight enough to hold the wire but not too tight to "neck" the wire.

Still another field method of dead-ending wire is that which employs "guy clamps" comprising a pair of grooved parallel plates, usually having three bolts, clamped over the two parts of the wire. Some clamps, of course, have only one or two bolts. In anchoring extra strong wires or strands, two or more of the clamps having the three bolts are used in series. These clamps, because they make a "surface" contact with the wire, do not "neck" the wire as did the U-bolt clip but they are objectionable since the friction grip developed between the wire and the plates is not very great. Thus, several clamps are needed to develop the holding power. This results in a long string of clamps which are unsightly, expensive and require much time to apply. Here again some skill is required to pull each bolt up tight enough to hold but not too tight to damage the threads. In order to develop higher friction between the plates and the wire, the device of Patent No. 2,231,238, assigned to the assignee of this application, was developed, which comprises the use of wire gripping material upon the grooved plates. Although this device reduced the number of clamps required, the total cost was not proportionately reduced since the unit cost for each clamp was greater. This device is evidence that better methods are needed. Another objection to the guy clamps is that the wires keep slipping out of the sides of the clamps as the clamp, during installation, is pushed up close against a large eye or against a pole around which the wire is snubbed.

An object of the invention is the provision of a wire holding device in the form of a hollow metal sleeve having two end portions facing each other and arranged to be compressed toward each other upon the wires, wherein the two end portions are integrally joined together by collapsible side walls to complete the sleeve, the collapsible side walls collapsing inwardly against the wires upon the application of an inwardly directed pressure upon the two end portions.

Another object is the provision of a wire holding device adapted to encompass and be compressed upon adjacently disposed wires, wherein a female flash is produced instead of a male flash.

Another object is the provision of a wire holding device adapted to encompass and be compressed upon adjacently disposed wires wherein the device is provided with collapsible side walls which collapse inwardly toward the wires being joined to produce a female flash instead of a male flash.

Another object is the provision of a wire holding device having an encompassing body in the general form of a figure 8 to receive the wires to be joined, whereupon the side walls of the figure 8 collapse upon the application of inwardly directed pressure upon the ends of the figure 8.

Another object is the provision of applying pressure upon the wires to be joined in four different general directions, two of said pressures being the direct result of opposing compression members or dies and the two remaining forces being the result of the induced pressures set up in the holding device by the collapsing of the side walls thereof.

Another object is the provision of the collapsible side walls resisting collapsing action until the end engaging portions compress the wires to be joined tightly together to prevent the separation of the wires by the subsequent collapsing of the side walls acting against the sides of the wires.

Another object is the provision of a continuous encompassing body of metal arranged to be compressed about adjacently disposed wires by means of a clamping tool having opposing clamping surfaces of relatively narrow width.

Another object is the provision of a wire holding device which is economical to manufacture and which requires very little skill to install.

Another object is the provision of a wire holding device which prevents the wire from slipping out of the sides thereof as the device, during installation, is pushed up close against a large eye or against a pole or other object around which the wire is snubbed.

Another object is the provision of a wire holding device which forces the inequality in the contour of the adjacently disposed wires into each other for effecting a good locking engagement therebetween, independent of any friction between the wires and the holding device.

Another object is the provision of a wire holding device which develops a strong holding power.

Another object is the provision of a wire holding device which can not be as easily loosened as are all the nut and bolt actuated devices described hereinbefore.

Other objects and a fuller understanding of the invention may be had by referring to the following description and claims, taken in conjunction with the accompanying drawing, in which:

Figure 1 is a side elevational view of an elongated hollow tube from which our wire holding device may be made, the Figure 1 being broken into to indicate that it is of an indefinite length;

Figure 2 is an end view of the hollow tube shown in Figure 1;

Figure 3 is a perspective view of the wire holding device which is constructed by cutting or severing the flattened tube in Figure 1 at spaced intervals;

Figure 4 is a side elevational view of the wire holding device with the wire inserted therein preparatory to clamping action;

Figure 5 is a side elevational view of the head portion of a clamping tool employed to compress the wire holding device about adjacently disposed wires;

Figures 6, 7, 8 and 9 are cross-sectional views of our wire holding device with the wire therein, showing progressively the stages through which the clamping action passes to complete the compression of the wire holding device about the wires to be joined;

Figure 10 is a side elevational view of the wire shown in Figure 4 with the sleeve completely compressed;

Figure 11 is a side elevational view of our wire holding device after it has been compressed by the tool in Figure 5 upon two side-by-side wires which longitudinally overlap each other; and Figure 12 is a view similar to Figure 11 except that the joined wires are solid instead of stranded.

The wire holding device is represented by the reference character 24 and is shown in its finished form in Figure 3. It is adapted to encompass and be compressed upon adjacently disposed wires and finds special utility for making joints where the wires longitudinally overlap and lie side-by-side including splices and dead-ends where the end portion of the wire is looped through an eye or snubbed around a pole or other object and bent back upon itself and then joined together. As illustrated in Figure 3, the wire holding device comprises a hollow metal sleeve having two end engaging or wire-receiving portions 21 and 22 integrally joined together by inwardly collapsible side walls 23 to complete the sleeve. The sleeve is seamless and comprises a continuous encompassing wall of metal to receive the wires to be joined.

The wire holding device 24 may be constructed by first taking an elongated hollow tube 20 having an elongated opening therethrough as shown in Figures 1 and 2 and then severing the elongated hollow tube 20 at predetermined intervals to make the finished product shown in Figure 3. The wire holding device 24 has a substantial wall thickness and is compressible about the wires incident to the application of inwardly directed pressure upon the two engaging ends 21 and 22. Any suitable arrangement of dies or other compression means may be employed to compress the sleeves about the wires to be joined. In actual practice, the wire holding device 24 may be compressed about the adjacently disposed wires by means of a constant movement clamping tool having a clamping tool head 30 actuated by the handles 35 and 36, as shown in Figure 5 of the drawing. The clamping tool head 30 comprises two clamping jaws 31 and 32 each having respectively arcuate die portions 33 and 34 to receive the engaging ends 21 and 22 of the sleeve. In clamping the sleeve between the arcuate die portions 33 and 34, the handles 35 and 36 are moved inwardly until the stops 44 engage each other. The clamping tool, being of the constant movement type, is arranged to move the movable jaws 31 and 32 inwardly during the compression of the wire holding device about the wires a definite amount as determined by the stops 44 mounted upon the handles 35 and 36.

In Figure 4, we illustrate the wire holding device 24 as receiving a stranded wire preparatory to the clamping action, in which the reference character 25 represents the loaded end of the wire, the reference character 26 the looped portion of the wire, and the reference character 27 the free end of the wire.

In making a wire joint, the sleeve with the wires disposed therein is inserted into the arcuate die portions 33 and 34 of the clamping jaws 31 and 32, after which the handles are moved inwardly to firmly compress the sleeve about the wire. Figure 5 shows the sleeve with the wires inserted therein, positioned between the arcuate dies 33 and 34. The Figures 6, 7, 8 and 9 show an enlarged view of the sleeve with the wires inserted therein, showing the progressive stages through which the clamping action passes to make the completed joint as shown in Figure 9. In Figure 6 the jaws are just beginning to tighten themselves about the arcuate engaging ends 21 and 22 of the sleeve. In Figure 7 the side walls 23 are beginning to collapse and move inwardly toward the side of the wires. The side walls 23 resist the collapsing action until the engaging ends 21 and 22 have first pressed the wires together, whereby the pressure from the collapsing walls does not prevent the wires from separating. In our invention the distance between the collapsible side walls 23 is reduced at a place substantially mid-way the two engaging ends 21 and 22 so that a force is set up in the side walls to cause them to collapse inwardly incident to the application of an inwardly directed pressure upon the two engaging ends 21 and 22 by the clamping jaws 31 and 32 of the tool. Our invention contemplates the provision of making the side walls 23 collapse inwardly by any means which reduces the distance between the side walls at a place substantially intermediate of the two end engaging portions 21 and 22. The encompassing wall of the sleeve may be described as being oval with inwardly disposed collapsing sides although the invention need not be limited to an oval construction as illustrated. The invention of making the side walls collapsible in an inward direction against the side of the wires produces an inward flash indicated by the reference character 37 which may be characterized as a female flash as distinguished from a male flash where metal is caused to flow outwardly between the mating arcuate die portions of the clamping tool. In Figure 8, which shows a progressive stage over Figure 7, the female flash 37 begins to compact further into the sides of the wires being joined to make an intimate contact engagement therewith. The compression action is continued until the completed joint is made as shown in Figure 9 where the sleeve is completely compacted around the wires. The sleeve receives compression or pressure in four different general directions, in which two of the general directions comprise the two opposing direct pressures from the clamping jaws of the tool and in which the other two remaining directions comprise the forces set up by the collapsing side walls incident to the direct pressure being applied to the two engaging ends 21 and 22. The sleeve may be so proportioned with respect to the arcuate die portions 33 and 34 that a small crease 38 is left remaining in the side of the sleeve. In other words, as the metal of the sleeve is coined about the joining wires there remains a small unfilled space between the jaws of the tool to create the crease 38. This construction eliminates the presence of a male flash on the outside of the finished sleeve. During the compression of the engaging ends 21 and 22 about the wires, the pressure flattens the wires against each other to provide a good interfitting engagement therebetween. Thus, the inequality in contour of one strand is forced into the other adjacent strand and effects a good interfitting or locking engagement therebetween, independent of any engagement between the strands and the inner surface of the sleeve.

Our wire holding device makes a "surface" contact with the wires being joined and insures substantially full strength of the wires. In other words, in the use of our device, there is substantially no "necking" of the wires because the metal of the wires can flow and become flattened in an attempt to conform to the free clearance spaces between the wires and the inner surface of the wire holding device. That is to say, the compression action flattens the wires, resulting in a change in their form but retaining substantially their cross-sectional area without any substantial "necking" action. Inasmuch as our wire holding device comprises a hollow metal sleeve having a continuous wall encompassing body, it prevents the wire from slipping out of the side thereof as was the case with the guy clamp during installation when the wire holding device is pushed close against a large eye or against a pole around which the wire is snubbed. In other words, our wire holding device can be placed very near a pole or large eye around which the wire is engaged.

We are not limiting ourselves to the type of tool shown in Figure 5 of the drawing since a screw or cam actuated press, or a hydraulic ram can also be used and are even more desirable on the larger sizes. Other tools which can be used are the impact tool and the rolling tool.

In Figure 10, we illustrate a side elevational view of the completed joint which shows the crease 38 extending longitudinally along the side of the sleeve. In addition to being employed as making a dead-end where the end portion of the wire is looped back upon itself, our invention finds utility in making splices as shown in Figure 11 where two stranded wires 40 and 41 are joined by our sleeve. In Figure 11 the wires longitudinally overlap each other and lie side-by-side in the sleeve. Figure 12 shows a view similar to Figure 11 except that the wires 42 and 43 are solid wires instead of stranded wires.

After our wire holding device has been compressed upon the wires to be joined, it cannot be as easily loosened as are all the nut and bolt actuated devices described hereinbefore. This is of practical importance for the reason that no one can tamper with the connections after they are once made so as to render them in a dangerous condition under actual performing operation. Our device requires very little skill for installation because it is only necessary for the oprator to close the jaws of the tool and the job is done. The tool is designed to accommodate wire holding dies of different sizes and is so proportioned that the compression performance is carried to the point where the wire portions within the sleeeve become flattened against each other to give a good interfitting or locking engagement between the wires.

In addition to characterizing our sleeve as an oval sleeve with inwardly disposed sides, it may be defined as a hollow sleeve having a cross section in the general form of a figure 8 to receive the wires, the side walls of the figure 8 sleeve being collapsible in an inward direction against the sides of the wires upon the application of an inwardly directed pressure upon the end portions of the figure 8 sleeve. The loops of the figure 8 are open so that the wires being joined may be compacted in the general direction of the major axis of the sleeve slightly prior to the collapsing of the side walls of the sleeves in the direction of the minor axis thereof to produce the female flash 37.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is as follows:

1. A wire holding device adapted to encompass and be compressed upon adjacently disposed wires comprising a hollow metal sleeve having two wire-receiving portions facing each other and arranged to be forced toward each other upon the wires, said two wire-receiving portions being integrally joined by inwardly collapsible side walls to complete the said sleeve, the distance between the collapsible side walls being reduced intermediate the two wire-receiving portions, whereby application of opposingly directed pressure upon the two wire-receiving portions forces the inwardly collapsible side walls and the two wire-receiving portions against the wires with the wires firmly engaging each other to prevent relatively longitudinal movement therebetween.

2. A wire holding device adapted to encompass and be compressed upon adjacently disposed wires comprising a hollow metal sleeve having two substantially semi-cylindrical portions facing each other and arranged to be forced toward each other upon the wires, said two substantially semi-cylindrical portions being integrally joined by inwardly collapsible side walls to complete the said sleeve, the distance between the collapsible side walls being reduced intermediate the two substantially semi-cylindrical portions, whereby application of opposingly directed pressure upon the two substantially semi-cylindrical portions forces the inwardly collapsible side walls and the two wire receiving portions against the wires with the wires firmly engaging each other to prevent relatively longitudinal movement therebetween.

3. A wire holding device adapted to encompass and be compressed upon adjacently disposed wires comprising a hollow metal sleeve having two wire-receiving portions facing each other and arranged to be forced towards each other upon the wires, said two wire-receiving portions being integrally joined by inwardly bowed, collapsible side walls to complete the said sleeve, whereby application of opposingly directed pressure upon the two wire-receiving portions forces the inwardly bowed, collapsible side walls and the two wire-receiving portions against the wires with the wires firmly engaging each other to prevent relatively longitudinal movement therebetween.

4. A wire holding device adapted to encompass and be compressed upon adjacently disposed wires by opposing dies, said wire holding device comprising a hollow metal sleeve having two wire-receiving portions facing each other and arranged to be forced toward each other upon the wires by said opposing dies, said two wire-receiving portions being integrally joined by inwardly collapsible side walls to complete the said sleeve, the distance between the collapsible side walls being reduced intermediate the two wire-receiving portions, whereby application of opposingly directed pressure by said opposing dies upon the two wire-receiving portions forces the inwardly collapsible side walls and the two wire-receiving portions against the wires with the wires firmly engaging each other to prevent relatively longitudinal movement therebetween, the space relationship between the dies, the wires and the sleeve being such that the space between the wires and the sleeve receives all flow of metal resulting from the decrease of dimensions of the sleeve due to opposing die pressure, thereby eliminating any external flash.

OTTO P. WARNER.
FRANK STUART.